US010591580B2

(12) United States Patent
Lee et al.

(10) Patent No.: US 10,591,580 B2
(45) Date of Patent: Mar. 17, 2020

(54) DETERMINING LOCATION USING TIME DIFFERENCE OF ARRIVAL (71) Applicant: Hewlett-Packard Development Company, L.P., Houston, TX (US)

(72) Inventors: Bowon Lee, Mountain View, CA (US); Souvik Sen, Mountain View, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 224 days.

(21) Appl. No.: 15/513,758

(22) PCT Filed: Sep. 23, 2014

(86) PCT No.: PCT/US2014/056925
§ 371 (c)(1),
(2) Date: Mar. 23, 2017

(87) PCT Pub. No.: WO2016/048279
PCT Pub. Date: Mar. 31, 2016

(65) Prior Publication Data
US 2017/0285133 A1 Oct. 5, 2017

(51) Int. Cl.
*G01S 3/80* (2006.01)
*G01S 5/26* (2006.01)
(Continued)

(52) U.S. Cl.
CPC ............. *G01S 5/26* (2013.01); *G01S 5/28* (2013.01); *G06F 3/02* (2013.01); *G06F 3/0433* (2013.01); *G06F 3/04886* (2013.01)

(58) Field of Classification Search
None
See application file for complete search history.

(56) References Cited

U.S. PATENT DOCUMENTS 4,677,600 A 6/1987 Yoshida
6,266,048 B1* 7/2001 Carau, Sr. ............. G06F 1/1613
341/22

(Continued)

OTHER PUBLICATIONS

NN8803398 Disclosure. Title: Virtual Integrated Mouse. vol. No. 30. Issue No. 10. p. No. 398-401. Publication-Date: Mar. 1, 1988 (Mar. 1, 1988). Cross Reference: 0018-8689-30-10-398. (Year: 1988).*

(Continued)

*Primary Examiner* — Isam A Alsomiri
*Assistant Examiner* — Jonathan D Armstrong
(74) *Attorney, Agent, or Firm* — HP Inc. Patent Department (57) ABSTRACT

Example implementations relate to determining a location using time difference of arrival (TDOA). For example, a computing device may include a first sensor to receive a signal at a first time, where the signal is generated by a user contact at a particular location on a keyboard associated with the computing device. The computing device also includes a second sensor to receive the signal at a second time and a third sensor to receive the signal at a third time. The computing device may also include a processor. The processor may calculate a set of TDOAs associated with the first time, the second time, and the third time. The processor may determine the particular location of the user contact using a triangulation based on the set of TDOAs and may identify a character on the keyboard, where the character is associated with the particular location.

13 Claims, 5 Drawing Sheets (51) Int. Cl.
  *G06F 3/02* (2006.01)
  *G06F 3/043* (2006.01)
  *G06F 3/0488* (2013.01)
  *G01S 5/28* (2006.01)

(56) References Cited

U.S. PATENT DOCUMENTS

| | | | | |
|---|---|---|---|---|
| 6,512,838 B1* | 1/2003 | Rafii | ............. | G01C 3/08 |
| | | | | 348/E3.018 |
| 6,650,318 B1 | 11/2003 | Boaz | | |
| 10,228,848 B2* | 3/2019 | Walline | ............. | G06F 3/017 |
| 2002/0061217 A1* | 5/2002 | Hillman | ............. | G06F 3/0202 |
| | | | | 400/489 |
| 2003/0132950 A1* | 7/2003 | Surucu | ............. | G06F 1/1626 |
| | | | | 715/700 |
| 2003/0174125 A1* | 9/2003 | Torunoglu | ............. | G01S 5/02 |
| | | | | 345/168 |
| 2003/0218760 A1* | 11/2003 | Tomasi | ............. | G06F 1/1626 |
| | | | | 356/614 |
| 2003/0218761 A1* | 11/2003 | Tomasi | ............. | G06F 1/1626 |
| | | | | 356/627 |
| 2004/0136564 A1* | 7/2004 | Roeber | ............. | G06F 3/0488 |
| | | | | 382/100 |
| 2006/0192763 A1 | 8/2006 | Ziemkowski | | |
| 2006/0232558 A1 | 10/2006 | Chien | | |
| 2007/0070046 A1 | 3/2007 | Sheynblat et al. | | |
| 2009/0096751 A1* | 4/2009 | Ross | ............. | G06F 3/04886 |
| | | | | 345/168 |
| 2010/0164869 A1 | 7/2010 | Huang et al. | | |
| 2010/0214267 A1 | 8/2010 | Radivojevic et al. | | |
| 2011/0050576 A1 | 3/2011 | Forutanpour et al. | | |
| 2012/0206344 A1* | 8/2012 | Hill | ............. | G06F 3/03545 |
| | | | | 345/157 |
| 2012/0218188 A1 | 8/2012 | Kashtani | | |
| 2013/0283213 A1* | 10/2013 | Guendelman | ............. | G06F 3/017 |
| | | | | 715/848 |
| 2014/0145945 A1 | 5/2014 | Shin | | |
| 2014/0267029 A1* | 9/2014 | Govil | ............. | G06K 9/00355 |
| | | | | 345/157 |
| 2015/0293644 A1* | 10/2015 | Watanabe | ............. | G06F 3/0426 |
| | | | | 345/168 |
| 2015/0363006 A1* | 12/2015 | Hsu | ............. | G06F 3/0219 |
| | | | | 345/168 |
| 2017/0170826 A1* | 6/2017 | Henty | ............. | H03K 17/969 |

OTHER PUBLICATIONS

Habib, et al., "Trainable Gesture Recognition Framework for Virtual Keyboard," Proceedings of the 5th ESEAS Int. Conf. on Signal, Speech and Image Processing, Greece, Aug. 17-19, 2005, pp. 227-230.

Wang et al., "Ubiquitous Keyboard for Small Mobile Devices: Harnessing Multipath Fading for Fine-grained Keystroke Localization," Jun. 16, 2014, pp. 14-27, ACM.

Miller, "Develop a Vibration-based Virtual Keyboard for Smartphones," Nov. 14, 2012, pp. 1-4, TechCrash.

* cited by examiner

DETERMINING LOCATION USING TIME DIFFERENCE OF ARRIVAL

CROSS-REFERENCE TO RELATED APPLICATION

This application is a U.S. National Stage Application of and claims priority to International Patent Application No. PCT/US2014/056925, filed on Sep. 23, 2014, and entitled "DETERMINING LOCATION USING TIME DIFFERENCE OF ARRIVAL," which is hereby incorporated by reference in its entirety.

BACKGROUND

Mobile computing has become prevalent, allowing users to access the functionality of mobile devices from virtually anywhere in the world. Many mobile devices provide access to this functionality through the use of a touchscreen of the device. The touchscreen may be capable of receiving inputs from users. For example, a user may be presented with a keyboard displayed on the screen of a computing device, and a user may touch various keys on the keyboard on the screen to type on the computing device.

BRIEF DESCRIPTION OF THE DRAWINGS

Some examples of the present application are described with respect to the following figures.

DETAILED DESCRIPTION

As described above, mobile computing has becoming prevalent. For example, many users may use portable computing devices such as mobile phones and tablets to work from various locations. Many computing devices may provide a touchscreen display to receive inputs from users, such as keyboard inputs. However, typing on these keyboards may be difficult for users for several reasons, such as the small form factor of the computing device, the difficulty involved with holding the computing device while attempting to type, the error rate associated with typing on a touchscreen keyboard, and the like.

In various examples in accordance with the present disclosure, a keyboard may be used with a computing device to allow users to type more naturally by detecting keystrokes on the keyboard using a signal generated each time a user provides a keystroke. The signal may be an acoustic signal and/or a vibrational signal generated when a user makes contact with the keyboard at a particular location on the keyboard. The keyboard may be integrated with and/or discrete from the computing device, may be near the computing device, and may be any type of keyboard, such as a physical or a virtual keyboard. A physical keyboard may include any type of physical keyboard, such as a mechanical keyboard, a touch keyboard, and the like. A virtual keyboard may include any type of virtual keyboard, such as an outline of a keyboard (e.g., on a piece of paper), a surface (e.g., a tabletop on which the computing device rests), and the like. The computing device may detect a signal associated with a keystroke at sensors on the computing device. The sensors may be any suitable sensors capable of detecting signals associated with a keystroke on a keyboard, such as a microphone capable of detecting acoustic signals associated with a keystroke, an accelerometer capable of detecting vibrational signals associated with a keystroke, and the like. The computing device may determine at least one time difference of arrival (TDOA) associated with a signal received at the sensors. A TDOA of a signal received at two sensors is the difference in the amount of time for the signal to reach the first signal and the second signal. For example, when a user provides a keystroke on a keyboard, the signal may be detected by a first sensor at a first time and may be detected by a second sensor at a second time based on the distance of the sensors from the origin of the signal. The time for a signal to reach a particular sensor may be referred to as a time of arrival (TOA), and the difference between the first TOA and the second TOA results in the TDOA. For example, N number of sensors may generate a set of N TOAs resulting in a set of $N(N-1)/2$ TDOAs. The calculated TDOA may be used to identify the key associated with the keystroke, as each key on the keyboard is associated with a particular TDOA or a particular TDOA range. While the computing device may be described herein as a mobile computing device, one of ordinary skill in the art will appreciate that the techniques disclosed herein may be used with any type of computing device (e.g., a desktop computing device, workstation, thin client, retail point of sale, laptop, convertible computing device, scientific instrument, gaming device, wearable computing device, etc.).

Any suitable sound source localization techniques may be used to determine the location of a keystroke. For example, if a computing device has N number of sensors generating a set of $N(N-1)/2$ TDOAs, sound source localization may be determined using a least-squares technique.

In some examples, the computing device may include at least three sensors (e.g., at least three microphones, at least three accelerometers, etc.) capable of detecting a signal associated with a keystroke. When a keystroke is provided, each of the sensors may detect the signal associated with the keystroke, and a set of TDOAs associated with the signal may be determined. Triangulation or trilateration may be used to determine the two-dimensional (2-D) location of the keystroke origin using the set of TDOAs.

In some examples, the computing device may include at least two sensors (e.g., at least two microphones, at least two accelerometers, etc.) capable of detecting a signal associated with a keystroke. When a keystroke is provided, each of the sensors may detect the signal associated with the keystroke, and a TDOA associated with the signal may be determined. The computing device may access additional information, such as the layout of the keyboard, cluster information associated with machine-learned information, information about the acoustic and/or vibrational signature of the signal, and the like, to more accurately calculate the 2-D location of the keystroke origin. The computing device may use the TDOA determined and the additional information accessed to calculate the 2-D location of the keystroke origin.

In some examples, the keyboard may be initially calibrated for use with the computing device. For example, the computing device may prompt a user to press a particular character on the keyboard, and the TDOA(s) associated with the particular character may be determined. The user may be prompted to press a second character, and the TDOA(s) associated with the second character may be determined as well as the orientation of the keyboard with respect to the computing device. The user may be prompted to press any number of characters to calculate the corresponding TDOAs, and the TDOA(s) may be associated with each of the characters pressed. In some examples, the computing device may know or may have access to information associated with the keyboard being used, such as the layout of the keyboard, the orientation of the keys relative to one another, and the like. Because the information associated with the keyboard may include the orientation of the keys relative to one another, the information associated with the keyboard as well as TDOAs associated with at least two characters may be used to determine TDOAs for the remainder of characters on the keyboard, minimizing the number of characters to be calibrated by the user.

In some examples, a mechanical keyboard may be used with the computing device. The mechanical keyboard may be in communication with the computing device wirelessly (e.g., using Bluetooth® technology). The mechanical keyboard may be powered (e.g., battery, radiofrequency (RF), solar, etc.) initially during calibration of the keyboard with the computing device, and the keyboard power may be turned off after calibration to save power. In some examples, the battery may be recharged using any suitable type of power harvesting technology, such as RF, solar cells, and the like.

Figure 1:
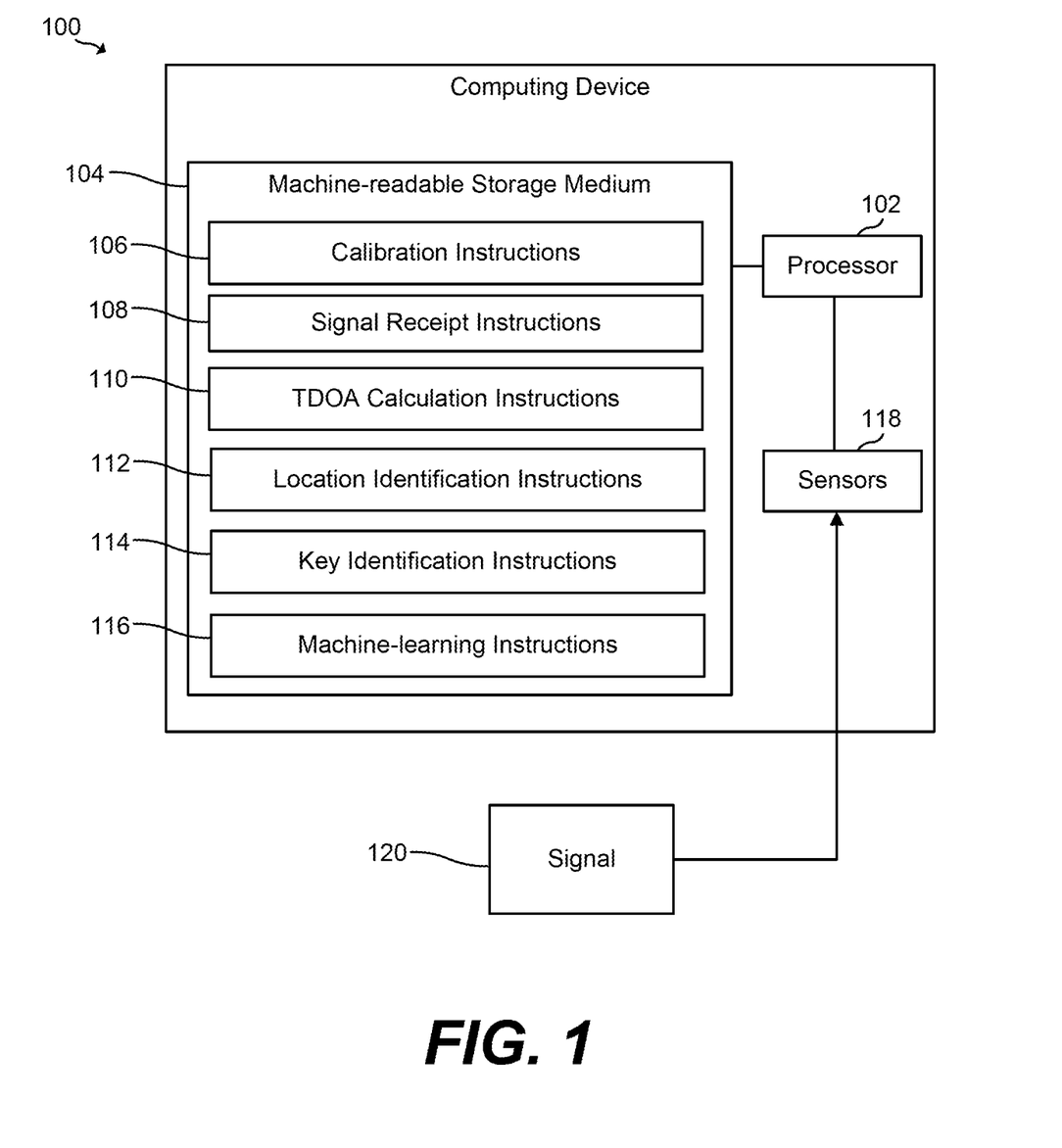
FIG. 1 is a block diagram of an example computing device for determining location using time difference of arrival.

Referring now to the figures, FIG. 1 is a block diagram of an example computing device 100 for determining location using TDOA. As used herein, a TDOA may be referred to as the difference in the amount of time for a particular signal to reach a first sensor and a second sensor. The TDOA may be used to determine the location at which the signal originated, where the location may be associated with a key on a virtual keyboard.

Computing device 100 may be, for example, a web-based server, a local area network server, a cloud-based server, a notebook computer, a desktop computer, an all-in-one system, a tablet computing device, a mobile phone, an electronic book reader, a printing device, or any other electronic device suitable for determining location using TDOA. Computing device 100 may include a processor 102 and a machine-readable storage medium 104. Computing device 100 may determine one or more TDOAs associated with a signal received at sensors 118 and may determine which key on a virtual keyboard was pressed by a user based on the TDOA(s).

Processor 102 is a tangible hardware component that may be a central processing unit (CPU), a semiconductor-based microprocessor, and/or other hardware devices suitable for retrieval and execution of instructions stored in machine-readable storage medium 104. Processor 102 may fetch, decode, and execute instructions 106, 108, 110, 112, 114, and 116 to control a process of determining location using TDOA. As an alternative or in addition to retrieving and executing instructions, processor 102 may include at least one electronic circuit that includes electronic components for performing the functionality of instructions 106, 108, 110, 112, 114, 116, or a combination thereof.

Machine-readable storage medium 104 may be any electronic, magnetic, optical, or other physical storage device that contains or stores executable instructions. Thus, machine-readable storage medium 104 may be, for example, Random Access Memory (RAM), an Electrically Erasable Programmable Read-Only Memory (EEPROM), a storage device, an optical disc, and the like. In some examples, machine-readable storage medium 104 may be a non-transitory storage medium, where the term "non-transitory" does not encompass transitory propagating signals. As described in detail below, machine-readable storage medium 104 may be encoded with a series of processor executable instructions 106, 108, 110, 112, 114, and 116 for receiving a signal at a first sensor at a first time, where the signal is generated by a user contact at a particular location on a keyboard associated with computing device 100; receiving the signal at a second sensor at a second time; receiving the signal at a third sensor at a third time; calculating a set of TDOAs associated with the first time, the second time, and the third time; determining a particular location of the user contact using a triangulation based on the set of TDOAs; and identifying a character on a keyboard, where the character is associated with the particular location.

Calibration instructions 106 may manage and control calibration of the keyboard with respect to computing device 100. For example, calibration instructions 106 may specify one or more keys for the user to enter. Calibration instructions 106 may determine TDOAs for each of the keys entered and may associate the TDOAs with the corresponding characters. In some examples, TDOAs for other keys not entered during calibration may be determined using the TDOAs for calibrated keys and the layout of the keyboard.

Signal receipt instructions 108 may manage and control receipt of signals (e.g., signal 120) at sensors 118. For example, the signals, including signal 120, may include any suitable type of signal generated by a user's contact with a keyboard associated with computing device 100, such as an acoustic signal, a vibrational signal, and the like. Sensors 118 may include any suitable number and type of sensor capable of detecting a signal generated by a user's contact with a keyboard associated with computing device 100, such as microphones, accelerometers, and the like.

TDOA calculation instructions 110 may manage and control the calculation of TDOA(s) associated with a signal received at sensors 118. For example, if sensors 118 include at least three sensors, TDOA calculation instructions 110 may calculate a set of TDOAs associated with a signal received at sensors 118. In another example, if sensors 118 include at least two sensors, TDOA calculation instructions 110 may calculate a TDOA associated with a signal received at sensors 118.

Location identification instructions 112 may manage and control determination and identification of a particular 2-D location of a signal's origin based on the TDOA(s) calculated by TDOA calculation instructions 110. For example, a particular 2-D location of a signal's origin may be determined based on the set of TDOAs calculated with respect to sensors 118 having at least three sensors, where the 2-D location may be calculated using a triangulation or a trilateration based on the set of TDOAs. In another example, a particular 2-D location of a signal's origin may be determined based on a TDOA calculated with respect to sensors 118 having at least two sensors, where the 2-D location may be calculated using the TDOA and any suitable additional information accessed by location identification instructions 112. As described above, the additional information may be any suitable information, such as the layout of the keyboard, cluster information associated with machine-learned information, information about the acoustic and/or vibrational signature of the signal, and the like.

Key identification instructions 114 may manage and control identification of keys or characters on a keyboard based on the 2-D location determined by location identification instructions 112. The 2-D location determined by location identification instructions 112 may be associated with the particular key or character. In some examples, the association of 2-D location with keys or characters may occur during calibration and/or based on knowledge of the layout of the keyboard.

Machine-learning instructions 116 may obtain, manage, and control machine-learned information relating to the keyboard and user inputs on the keyboard. For example, machine-learning instructions 116 may obtain and learn information about a range of 2-D locations that may be associated with a particular key or character.

Figure 2:
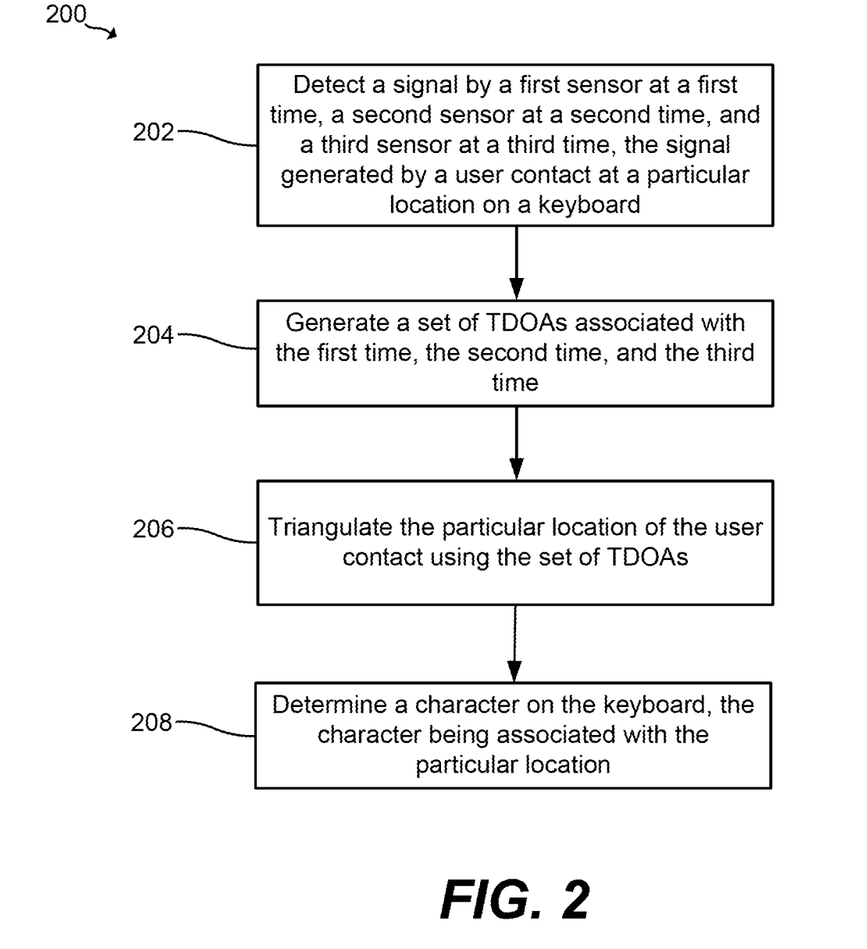
FIG. 2 is a flowchart illustrating an example method of determining location using time difference of arrival based on at least three sensors.

FIG. 2 is a flowchart illustrating an example method 200 of determining location using TDOA based on at least three sensors. Method 200 may be implemented using computing device 100 of FIG. 1.

Method 200 includes, at 202, detecting a signal by a first sensor at a first time, a second sensor at a second time, and a third sensor at a third time, where the signal is generated by a user contact at a particular location on a keyboard. The first sensor, second sensor, and third sensor may be part of a computing device (e.g., sensors 118 of computing device 100 of FIG. 1) associated with the keyboard. For example, the first sensor, second sensor, and third sensor may be microphones, accelerometers, and the like.

Method 200 also includes, at 204, generating a set of TDOAs associated with the first time, the second time, and the third time. For example, the set of TDOAs may include a TDOA associated with the difference in arrival times between the first time and the second time, a TDOA associated with the difference in arrival times between the second time and the third time, and a TDOA associated with the difference in arrival times between the third time and the first time.

Method 200 also includes, at 206, triangulating the particular location of the user contact using the set of TDOAs. For example, the set of TDOAs may be used to triangulate the particular 2-D location with respect to the computing device.

Method 200 also includes, at 208, determining a character on the keyboard, the character being associated with the particular location. For example, the character may be determined based on its association with a particular 2-D location and/or range of 2-D locations (e.g., based on calibration, knowledge of the keyboard layout, machine-learned information, etc.).

Figure 3:
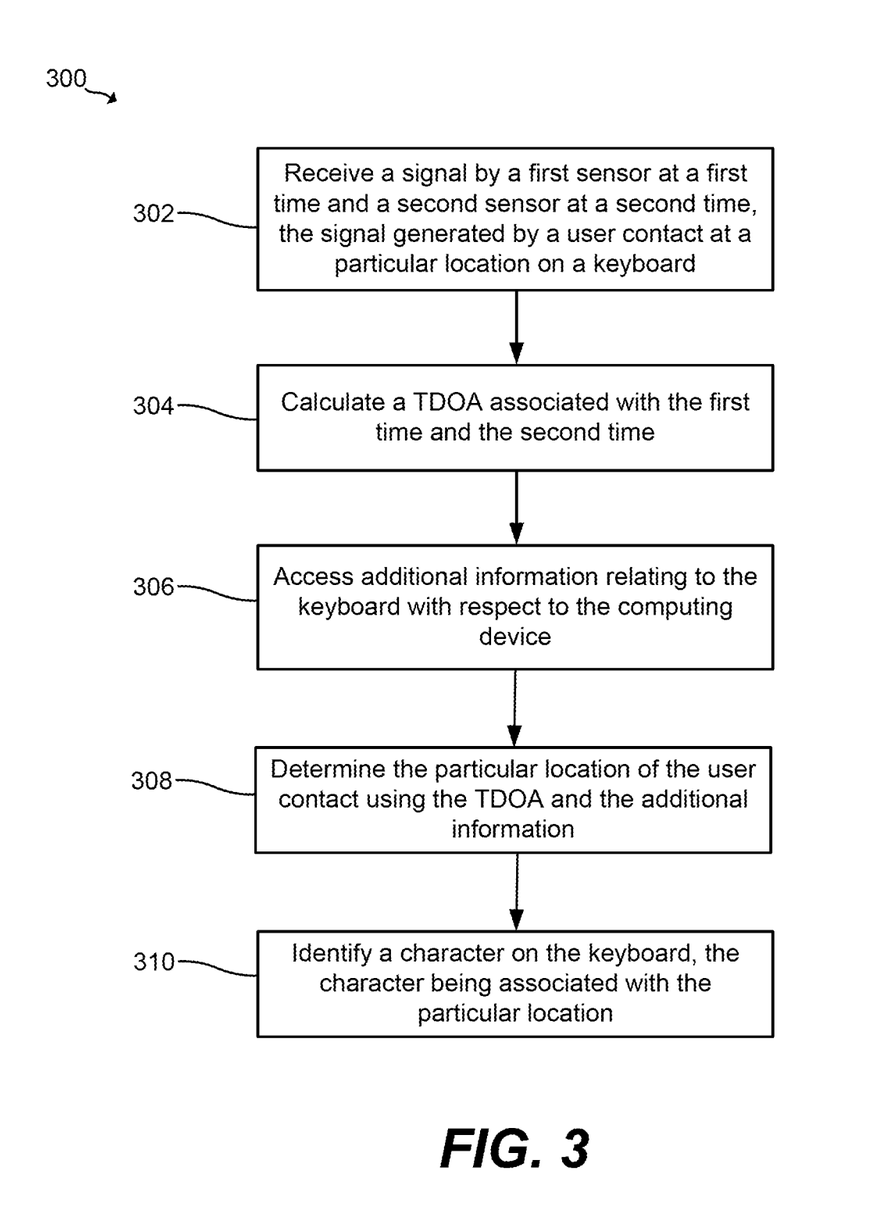
FIG. 3 is a flowchart illustrating an example method of determining location using time difference of arrival based on at least two sensors.

FIG. 3 is a flowchart illustrating an example method 300 of determining location using TDOA based on at least two sensors. Method 300 may be implemented using computing device 100 of FIG. 1.

Method 300 includes, at 302, receiving a signal by a first sensor at a first time and a second sensor at a second time, where the signal is generated by a user contact at a particular location on a keyboard. The first sensor and second sensor may be part of a computing device (e.g., sensors 118 of computing device 100 of FIG. 1) associated with the keyboard. For example, the first sensor and the second sensor may be microphones, accelerometers, and the like.

Method 300 also includes, at 304, calculating a TDOA associated with the first time and the second time. For example, the TDOA may be the difference in arrival times between the first time and the second time.

Method 300 also includes, at 306, accessing additional information relating to the keyboard with respect to the computing device (e.g., computing device 100 of FIG. 1). As described above, the additional information may include any suitable additional information, such as the layout of the keyboard, cluster information associated with machine-learned information, information about the acoustic and/or vibrational signature of the signal, and the like.

Method 300 also includes, at 308, determining the particular location of the user contact using the TDOA and the additional information. For example, based on the TDOA and any suitable additional information, the particular 2-D location of the user contact may be determined.

Method 300 also includes, at 310, identifying a character on the keyboard, the character being associated with the particular location. For example, the character may be determined based on its association with a particular 2-D location and/or range of 2-D locations (e.g., based on calibration, knowledge of the keyboard layout, machine-learned information, etc.).

Figure 4:
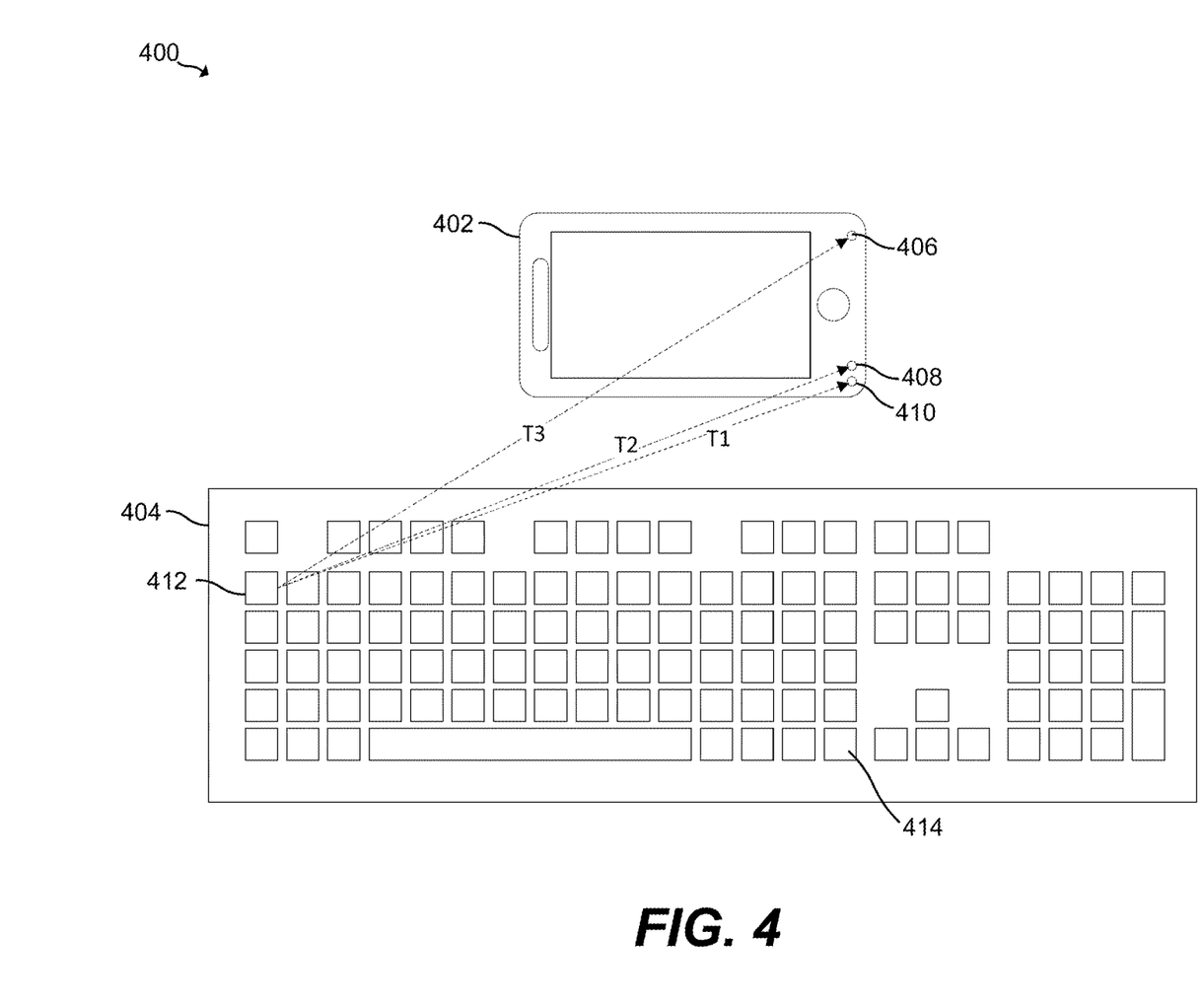
FIG. 4 is a block diagram of an example system for determining location using time difference of arrival.

FIG. 4 is a block diagram of an example system 400 for determining location using time difference of arrival. System 400 includes computing device 402 and keyboard 404 located associated with computing device 402. In some examples, computing device 402 may be in contact with keyboard 404.

Computing device 402 may be similar to computing device 100 of FIG. 1 and may include at least two sensors, such as sensors 406, 408, and 410. Sensors 406, 408, and 410 may be any type of suitable sensors, such as microphones, accelerometers, and the like.

Keyboard 404 may be a physical keyboard (e.g., mechanical keyboard, touch keyboard, etc.) or a virtual keyboard (e.g., an outline of a keyboard, a surface, etc.).

A user may type on keyboard 404, and each user contact or keystroke may generate a signal (e.g., an acoustic signal, a vibrational signal, etc.). For example, if a user presses key 412 on keyboard 404, an acoustic and a vibrational signal may be generated. The signal may propagate through a particular medium. For example, an acoustic signal generated by a keystroke may propagate through air, and a vibrational signal generated by a keystroke may propagate through a surface (e.g., keyboard 404, computing device 402). The generated signal may be detected by sensors 406, 408, and 410. The signal may reach sensors 406, 408, and 410 at different times based on the different TOAs for the signal to travel the distance between key 412 and each of the sensors. For example, the generated signal may reach sensor 406 at time T3, may reach sensor 408 at time T2, and may reach sensor 410 at time T1. A set of TDOAs associated with the generated signal may be calculated. For example, a TDOA of the signal for sensors 406 and 408 may be the difference between time T3 and time T2, a TDOA of the signal for sensors 408 and 410 may be the difference between time T2 and time T1, and a TDOA of the signal for sensors 406 and 410 may be the difference between time T3 and time T1. This set of TDOAs may be used to triangulate the 2-D location of key 412 with respect to computing device 402. This 2-D location may be used to determine the particular character associated with the 2-D location, and the associated character may be displayed accordingly in response to the user contact.

During calibration, a user may be prompted to enter one or more specified characters to calibrate keyboard 404 with respect to computing device 402. For example, a user may be prompted to enter the 'tab' character, and in response, a user may press key 412. Computing device 402 may calculate and store a set of TDOAs associated with the signal generated by the user's contact with key 412. This set of TDOAs may then be used to determine the keystroke associated with key 412. The user may be prompted to enter any number of keys during calibration. In some examples, the orientation of keyboard 404 with respect to computing device 402 may be determined if the 2-D locations of at least two keys are known. For example, if the 2-D locations of keys 412 and 414 are known, computing device 402 may be able to determine the orientation of keyboard 404 with respect to computing device 402 (e.g., an angle at which keyboard 404 is situated with respect to computing device 402). In some examples, if computing device 402 has information associated with the layout of keyboard 404 (e.g., information associated with the size of each key on keyboard 402, the distance between keys, etc.), the locations of keys that have not been calibrated may be determined using the known location of at least one key (e.g., keys 412 and 414), the orientation of keyboard 404 with respect to computing device 402 (e.g., as determined using at least two keys, such as keys 412 and 414), and the layout of keyboard 404.

Figure 5:
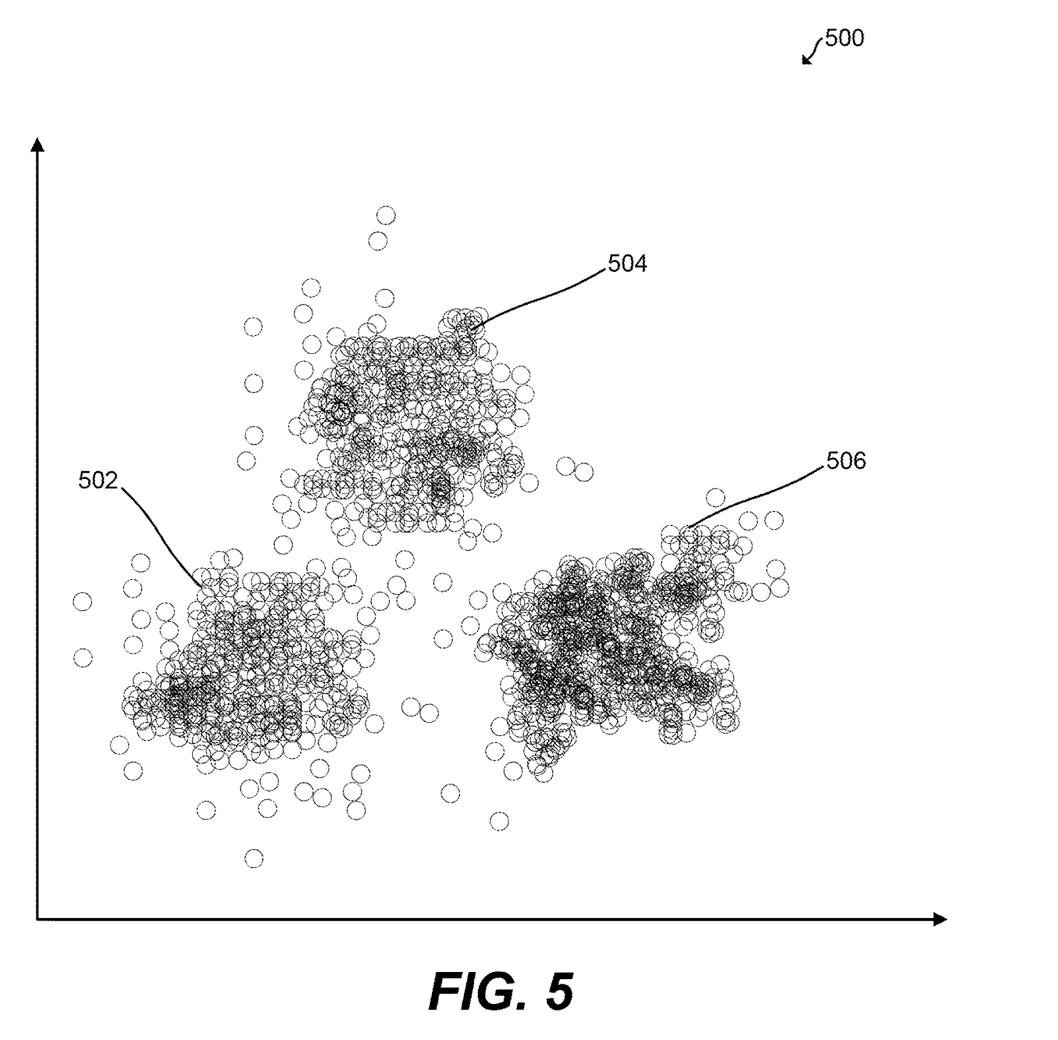
FIG. 5 is a graph of an example cluster map showing two-dimensional locations for various inputs.

FIG. 5 is a graph of an example cluster map 500 showing 2-D locations for various inputs. Cluster map 500 may be generated based on user contacts with particular keys each associated with clusters 502, 504, or 506. For example, cluster 502 may be generated as the user enters the key associated with the character "A," cluster 504 may be generated as the user enters the key associated with the character "W," and cluster 406 may be generated as the user enters the key associated with the character "S." These clusters may be used to more accurately determine keystrokes based on machine-learning techniques. For example, referring to cluster 502, a user may make contact with the key associated with character "A" within a range of locations indicated by cluster 502. This range of locations may be used to identify whether a keystroke detected is associated with character "A." Any suitable clustering techniques may be used, such as k-means clustering. Once cluster locations are determined, each cluster may be mapped to each of the keys of the keyboard.

Examples provided herein (e.g., methods) may be implemented in hardware, software, or a combination of both. Example systems may include a controller/processor and memory resources for executing instructions stored in a tangible non-transitory medium (e.g., volatile memory, non-volatile memory, and/or machine-readable media). Non-transitory machine-readable media can be tangible and have machine-readable instructions stored thereon that are executable by a processor to implement examples according to the present disclosure.

An example system can include and/or receive a tangible non-transitory machine-readable medium storing a set of machine-readable instructions (e.g., software). As used herein, the controller/processor can include one or a plurality of processors such as in a parallel processing system. The memory can include memory addressable by the processor for execution of machine-readable instructions. The machine-readable medium can include volatile and/or non-volatile memory such as a random access memory ("RAM"), magnetic memory such as a hard disk, floppy disk, and/or tape memory, a solid state drive ("SSD"), flash memory, phase change memory, and the like.

What is claimed is:

1. A computing device comprising:
a wireless communication device, wherein the wireless communication device is communicatively coupled to a processor, and the wireless communication device receives a calibration signal from a physical keyboard;
a virtual keyboard superimposed on a surface of the physical keyboard;
a first sensor to receive a signal at a first time, the signal generated by a user contact of the physical keyboard at a particular location within the virtual keyboard;
a second sensor to receive the signal at a second time;
a third sensor to receive the signal at a third time; and
the processor to:
calculate a set of time differences of arrival (TDOAs) associated with the first time, the second time, and the third time;
determine the particular location within the virtual keyboard of the user contact of the physical keyboard using a triangulation based on the set of TDOAs based on the calibration signal;
identify a character on the virtual keyboard, the character being associated with the particular location of the physical keyboard; and
determine an angle of orientation of the physical keyboard with respect to the computing device based on the particular location of the physical keyboard of the identified character on the virtual keyboard.

2. The computing device of claim 1, wherein the first sensor, the second sensor, and the third sensor are each a microphone or an accelerometer.

3. The computing device of claim 1, wherein the processor is
further to access additional information relating to at least one of a keyboard layout of the physical keyboard and machine-learned information, the particular location within the virtual keyboard being determined using the triangulation and the additional information.

4. The computing device of claim 1, wherein power to the physical keyboard is turned on only during the calibration.

5. A method comprising:
receiving a calibration signal by a wireless communication device of a computing device;
detecting a signal by a first sensor of the computing device at a first time, a second sensor of the computing device at a second time, and a third sensor of the computing device at a third time, the signal generated by a user contact of a physical keyboard at a particular location within a virtual keyboard associated with the computing device;
generating, by the computing device, a set of time differences of arrival (TDOAs) associated with the first time, the second time, and the third time;
triangulating, by the computing device, the particular location within the virtual keyboard of the user contact of the physical keyboard using the set of TDOAs and the calibration signal;
determining a character on the virtual keyboard using a cluster map, the character being associated with the particular location of the virtual keyboard; and
determining, by the computing device, an angle of orientation of the physical keyboard with respect to the computing device based on the particular location within the virtual keyboard of the determined character on the virtual keyboard.

6. The method of claim 5, wherein the first sensor, the second sensor, and the third sensor are each a microphone or an accelerometer.

7. The method of claim 5, further comprising:
accessing additional information relating to at least one of a keyboard layout of the physical keyboard and machine-learned information, the particular location within the virtual keyboard being determined using the additional information.

8. A computing device comprising:
a wireless communication device, wherein the wireless communication device is communicatively coupled to a processor, and the wireless communication device receives a calibration signal from a physical keyboard;
a first sensor to receive a signal at a first time, the signal generated by a user contact of the physical keyboard at a particular location within a virtual keyboard, wherein the virtual keyboard is superimposed on a surface the physical keyboard;
a second sensor to receive the signal at a second time; and
the processor to:
 calculate a time difference of arrival (TDOA) associated with the first time and the second time;
 access additional information relating to the physical keyboard with respect to the computing device;
 determine the particular location within the virtual keyboard of the user contact of the physical keyboard using the TDOA, the additional information and the calibration signal;
 identify a character on the virtual keyboard using a cluster map, the character being associated with the particular location within the virtual keyboard; and
 determine an angle of orientation of the physical keyboard with respect to the computing device based on the particular location within the virtual keyboard of the identified character.

9. The computing device of claim 8, wherein the first sensor and the second sensor are each a microphone or an accelerometer.

10. The computing device of claim 8, wherein the additional information includes at least one of a keyboard layout of the physical keyboard, information associated with signal signatures of the signal received at the first sensor and the second sensor, and machine-learned information.

11. The computing device of claim 8, wherein the cluster map is generated based on the user contact of the physical keyboard with the particular location within the virtual keyboard associated with each cluster, and machine-learning is used to identify whether a keystroke is associated with a particular cluster.

12. The computing device of claim 8, wherein the additional information used is a layout of the physical keyboard to determine the physical keyboard orientation from two calculated TDOAs.

13. The computing device of claim 8, wherein the calculated TDOA is determined using a least-squares technique.

* * * * *